(12) United States Patent
Kraemer et al.

(10) Patent No.: US 6,453,857 B1
(45) Date of Patent: Sep. 24, 2002

(54) CONTROL DEVICE FOR CONTROLLING AN INTERNAL COMBUSTION ENGINE WITH A VARIABLY CONTROLLED VALVE STROKE

(75) Inventors: Gerd Kraemer, Baierbrunn; Klaus Bourdon, Hettenshausen; Helmut Eichlseder, Baldham; Heiko Konrad, Baierbrunn, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/964,629

(22) Filed: Sep. 28, 2001

(30) Foreign Application Priority Data

Sep. 29, 2000 (DE) .......................................... 100 48 250

(51) Int. Cl.⁷ .............................................. F02D 43/04
(52) U.S. Cl. ..................................... 123/90.15; 123/436
(58) Field of Search .......................... 123/90.15, 90.16, 123/436; 701/111

(56) References Cited

U.S. PATENT DOCUMENTS 6,039,026 A    3/2000   Shiraishi et al. ............ 123/399
6,145,489 A  * 11/2000  Kazama et al. ............. 123/295
6,330,510 B1 * 12/2001  Takaku et al. ............... 701/114

FOREIGN PATENT DOCUMENTS

| DE | 198 47 851 | 4/1999 |
| DE | 198 59 018 | 6/2000 |
| DE | 198 59 074 | 6/2000 |

* cited by examiner

*Primary Examiner*—Weilun Lo
(74) *Attorney, Agent, or Firm*—Crowell & Moring LLP

(57) ABSTRACT

A control device for controlling an internal combustion engine with a variably controlled valve stroke and with a butterfly valve in an air intake tract is provided. The control device is equipped with devices with which the even running of the internal combustion engine is monitored and through which the butterfly valve is actuated in the closing direction when a defined uneven running threshold value has been exceeded and when the valve stroke is smaller than a specified threshold until the value drops below the uneven running threshold value again.

2 Claims, 1 Drawing Sheet

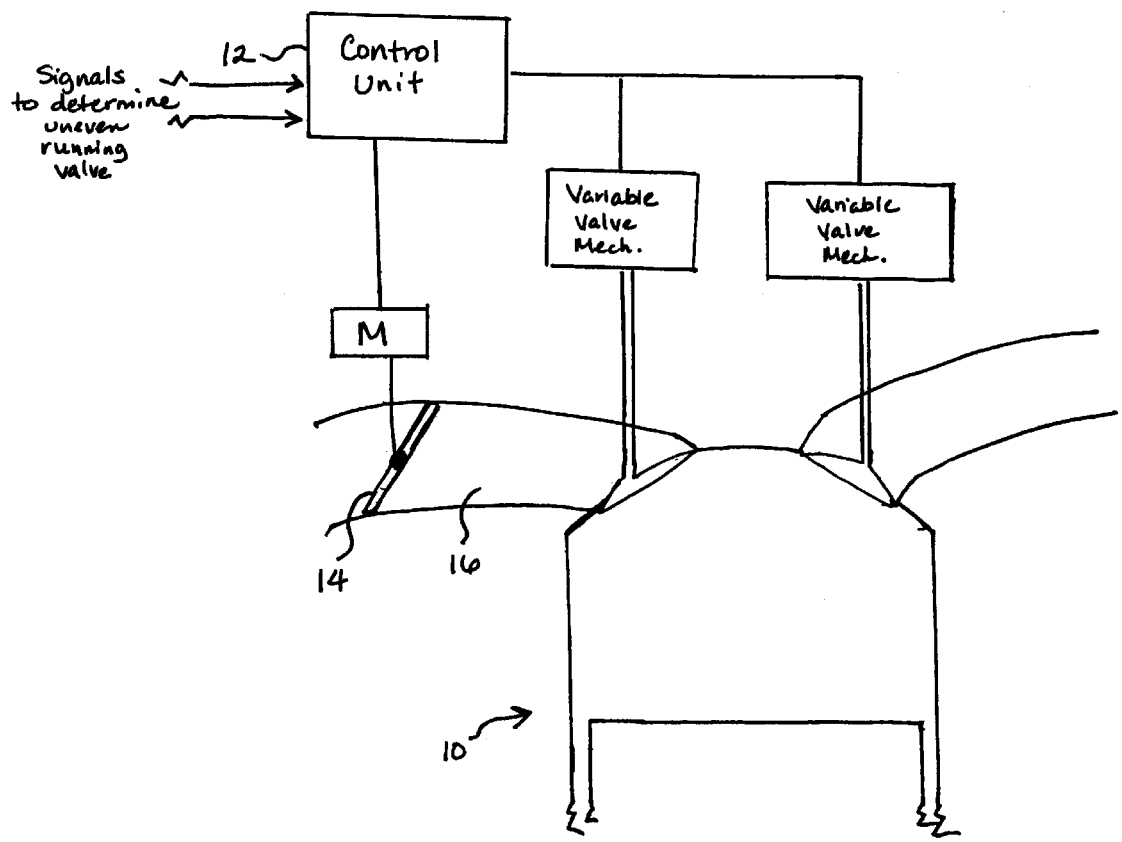
Figure

CONTROL DEVICE FOR CONTROLLING AN INTERNAL COMBUSTION ENGINE WITH A VARIABLY CONTROLLED VALVE STROKE

BACKGROUND AND SUMMARY OF THE INVENTION

This application claims the priority of German Application No. 100 48 250.3, filed Sep. 29, 2000, the disclosure of which is expressly incorporated by reference herein.

The invention relates to a control device for controlling an internal combustion engine with a variably controlled valve stroke and a butterfly valve in an intake tract of the engine.

Such a control device is known for example from German patent document DE 198 47 851 A1 (having U.S. counterpart U.S. Pat. No. 6,039,026, the specification of which is incorporated by reference herein). The known control device triggers an increase in the opening of a throttle (butterfly) valve in the intake port of an internal combustion engine with a variably controlled valve stroke at a low or medium-type load of the internal combustion engine in order to reduce a so-called undesirable "pumping loss".

Internal combustion engines with variably controlled valve strokes, however, exhibit large variations between the desired valve stroke target and the actually adjusted valve stroke in the unrestricted state. These standard deviations are dependent upon tolerances and can have a positive or negative effect. This uneven distribution leads to an uneven combustion air ratio during operation of the internal combustion engine, which in turn leads to increased uneven running.

The goal of the invention is to improve a control device of the above-described type in such a manner that the method for controlling the internal combustion engine, which is executed by the control device, increases the comfort level, reduces fuel consumption and prevents unnecessary efficiency deterioration.

This goal is achieved by a control device for controlling an internal combustion engine with a variably controlled valve stroke and with a butterfly valve in an intake tract. The control device is equipped with means to monitor the smooth running of the internal combustion engine. The control device is also equipped with means through which the butterfly valve is actuated in the closing direction when a defined uneven running threshold value has been exceeded and when the valve stroke is smaller than a specified threshold, until the value drops below the uneven running threshold value again.

Other objects, advantages and novel features of the present invention will become apparent from the following detailed description of the invention when considered in conjunction with the accompanying drawings.

BRIEF DESCRIPTION OF THE DRAWINGS

The FIGURE is a simplified diagram of a system having the control device according to the present invention.

DETAILED DESCRIPTION OF THE DRAWINGS

Referring to the FIGURE, in accordance with the present invention, smooth running of the internal combustion engine 10 is monitored with a control device 12 of the above-described kind. When a defined uneven running threshold value is exceeded and the valve stroke, particularly a target valve stroke, is smaller than a specified threshold (e.g. smaller than 1 mm), the threshold (butterfly) valve 14 in the air supply intake port 16 is actuated in the closing direction until the value drops below the uneven running threshold value again.

In order to avoid unacceptably high uneven running, the air supply is throttled accordingly. In order to determine the permissible uneven running value and/or to define a specified uneven running value, engine torque irregularity values or similar signals, which can be gained, for example, from ion current or pressure measurement, can be used. Methods for determining even running have already been determined. Since the throttling process therefore only takes place with unacceptable uneven running, the efficiency of the internal combustion engine is not worsened. This way, dependent on the spread, the valve strokes that are required for the lowest fuel consumption can always be adjusted.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device for controlling an internal combustion engine having a variable controlled valve stroke, the control device comprising:

a throttle valve arranged in an intake port;

means for monitoring a running operation of the internal combustion engine and determining an uneven running value;

wherein when a defined uneven running threshold value is exceeded and a valve stroke is less than a specified threshold valve stroke, said control device actuates the throttle valve in a closing direction until the determined uneven running value falls below the defined uneven running threshold value.

2. A method of controlling an internal combustion engine having a variably controlled valve stroke and a throttle valve arranged in an intake port of the internal combustion engine, the method comprising the acts of:

receiving signals indicative of a running operation of the internal combustion engine;

determining from said signals an uneven running value of the internal combustion engine;

actuating the throttle valve in a closing direction when the determined uneven running value exceeds a defined uneven running threshold value and a valve stroke is less than a specified threshold valve stroke until the uneven running value again falls below the defined uneven running threshold value.

* * * * *